US012115598B2

(12) United States Patent
Tracy et al.

(10) Patent No.: US 12,115,598 B2
(45) Date of Patent: Oct. 15, 2024

(54) ADAPTIVE OVERHAUL USING PLURAL SCANNING METHODS (71) Applicant: Pratt & Whitney Canada Corp., Longueuil (CA)

(72) Inventors: Kevin M. Tracy, Wichita Falls, TX (US); Charles Trent Daulton, Burkburnett, TX (US)

(73) Assignee: Pratt & Whitney Canada Corp., Quebec (CA)

( * ) Notice: Subject to any disclaimer, the term of this patent is extended or adjusted under 35 U.S.C. 154(b) by 0 days.

(21) Appl. No.: 18/116,569

(22) Filed: Mar. 2, 2023

(65) Prior Publication Data
US 2024/0293894 A1 Sep. 5, 2024

(51) Int. Cl.
*B23K 26/342* (2014.01)
*B23K 1/00* (2006.01)
(Continued)

(52) U.S. Cl.
CPC .......... *B23K 26/342* (2015.10); *B23K 1/0018* (2013.01); *B23K 26/323* (2015.10);
(Continued)

(58) Field of Classification Search
CPC .. B23K 1/0018; B23K 26/342; B23K 26/323; B23K 26/354; B23K 2101/001; B23K 26/082; B22F 10/66; B22F 10/80
See application file for complete search history.

(56) References Cited

U.S. PATENT DOCUMENTS 8,140,179 B2    3/2012   Drechsler et al.
8,442,665 B2    5/2013   Krause
(Continued)

FOREIGN PATENT DOCUMENTS

EP    3159080 A1    4/2017
EP    3933527 A1    1/2022
(Continued)

OTHER PUBLICATIONS

European Search Report for EP Application No. 24161212.6 dated Jun. 21, 2024.
(Continued)

*Primary Examiner* — Jermie E Cozart
(74) *Attorney, Agent, or Firm* — Carlson, Gaskey & Olds, P.C.

(57) ABSTRACT

A method of overhaul of a component includes a) scanning a component using computed tomography to provide first scanned data, b) comparing the first scanned data to reference data to provide additive manufacturing data, c) depositing material on the component using an additive manufacturing device based upon the additive manufacturing data to provide a first object, d) scanning the first object using structural light scan to provide second scanned data, and determining predicted characteristics of the first object based upon the second scanned data of step a), e) comparing the predicted characteristics of the first object to the reference data to provide machining data and f) machining the first object using the machining data. A system for overhauling the component is also disclosed.

18 Claims, 5 Drawing Sheets

(51) Int. Cl.
  *B23K 26/323* (2014.01)
  *B23P 6/00* (2006.01)
  *B33Y 10/00* (2015.01)
  *B33Y 50/02* (2015.01)
  *B23K 26/082* (2014.01)
  *B23K 26/354* (2014.01)
  *B23K 101/00* (2006.01)

(52) U.S. Cl.
  CPC .............. *B23P 6/007* (2013.01); *B33Y 10/00* (2014.12); *B33Y 50/02* (2014.12); *B23K 26/082* (2015.10); *B23K 26/354* (2015.10); *B23K 2101/001* (2018.08)

(56) References Cited

U.S. PATENT DOCUMENTS

| | | | |
|---|---|---|---|
| 8,910,361 | B2 | 12/2014 | Rickenbacher et al. |
| 9,174,312 | B2 | 11/2015 | Baughman et al. |
| 9,719,356 | B2 | 8/2017 | Hanlon |
| 9,764,517 | B2 | 9/2017 | Potter |
| 9,902,024 | B2 | 2/2018 | Ernst et al. |
| 10,452,809 | B2 | 10/2019 | Huckerby |
| 10,814,439 | B2 | 10/2020 | Ozturk et al. |
| 10,955,815 | B2 | 3/2021 | Auxier et al. |
| 11,198,182 | B2 | 12/2021 | Worthing, Jr. et al. |
| 11,285,538 | B2 | 3/2022 | Shi et al. |
| 11,305,353 | B2 | 4/2022 | Geisen et al. |
| 11,334,051 | B2 | 5/2022 | Auxier et al. |
| 2002/0104973 | A1* | 8/2002 | Kerekes .................. B22F 10/22 250/559.2 |
| 2003/0149498 | A1 | 8/2003 | Rebello et al. |
| 2003/0206820 | A1 | 11/2003 | Keicher et al. |
| 2007/0163115 | A1 | 7/2007 | Cheng et al. |
| 2012/0179285 | A1 | 7/2012 | Melzer-Jokisch et al. |
| 2016/0243644 | A1 | 8/2016 | Moneta et al. |
| 2017/0001379 | A1 | 1/2017 | Long |
| 2017/0226860 | A1 | 8/2017 | Aschermann et al. |
| 2018/0243866 | A1 | 8/2018 | Srinivasan et al. |
| 2019/0022760 | A1 | 1/2019 | Coskun et al. |
| 2019/0366491 | A1 | 12/2019 | Ozturk et al. |
| 2019/0381603 | A1* | 12/2019 | Lan .................. B33Y 10/00 |
| 2021/0347008 | A1 | 11/2021 | Huckerby |
| 2022/0062997 | A1* | 3/2022 | Liu .................. B33Y 50/02 |
| 2022/0066426 | A1 | 3/2022 | Czinger et al. |
| 2022/0072646 | A1 | 3/2022 | Sato et al. |
| 2022/0212296 | A1 | 7/2022 | Kulkarni et al. |
| 2022/0212396 | A1 | 7/2022 | Tardif et al. |
| 2022/0212397 | A1 | 7/2022 | Edy |
| 2022/0274181 | A1 | 9/2022 | Kato |

FOREIGN PATENT DOCUMENTS

| | | |
|---|---|---|
| JP | 2009025119 A | 2/2009 |
| WO | 2022/179205 A1 | 9/2002 |
| WO | 2019/177607 A1 | 9/2019 |
| WO | 2022/189236 A1 | 9/2022 |
| WO | 2022/2234658 A1 | 11/2022 |

OTHER PUBLICATIONS

European Search Report for EP Application No. 24157193.4 dated May 22, 2024.
European Search Report for EP Application No. 24157197.5 dated May 22, 2024.
European Search Report for EP Application No. 24157196.7 dated May 31, 2024.

\* cited by examiner

ADAPTIVE OVERHAUL USING PLURAL SCANNING METHODS

BACKGROUND

This application relates generally to repairing a component utilizing a CT scan of the component to develop an additive manufacturing toolpath, then using a structured light scan to determine a machining toolpath.

Modern systems are including more and more complex components. As the components become more complex they become more expensive. There is thus need to repair the components rather than simply replace them.

Defects in a component may be repaired using braze filler material or weld filler. Various processes are known in the art for applying such material to a component. While these known processes have various advantages, there is still room in the art for improvement.

One type of components which are frequently subject to repair are components in a gas turbine engine.

SUMMARY

A method of overhaul of a component includes a) scanning a component using computed tomography to provide first scanned data, b) comparing the first scanned data to reference data to provide additive manufacturing data, c) depositing material on the component using an additive manufacturing device based upon the additive manufacturing data to provide a first object, d) scanning the first object using structural light scan to provide second scanned data, and determining predicted characteristics of the first object based upon the second scanned data of step a), e) comparing the predicted characteristics of the first object to the reference data to provide machining data and f) machining the first object using the machining data.

These and other features will be best understood from the following drawings and specification, the following is a brief description.

DETAILED DESCRIPTION

Figure 1A:
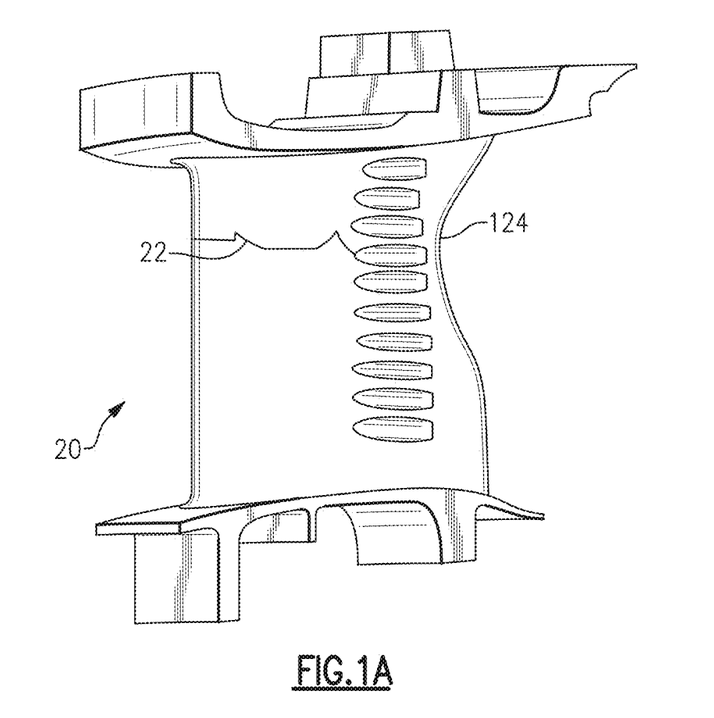
FIG. 1A shows a gas turbine engine component to be repaired.

A component 20 is illustrated in FIG. 1A as a turbine section static guide vane for a gas turbine engine. It should be understood that the teaching of this disclosure would extend to any number of other components for a gas turbine engine. As examples, vanes, combustor liners, compressor section components and any number of housing components may all benefit from the teachings of this disclosure. In fact, the teachings of this disclosure extend to repairing components for applications other than gas turbine engines.

The component 20 illustrated in FIG. 1A has two areas that indicate some needed repair. It should be understood that components in a gas turbine engine are subject to extreme conditions. Thus, a defect 22, such as a crack, a divot, a pitted area, etc. may form. Collectively these are referred to here as a void. Further, it is possible for an area of wear 124 to form.

Figure 1B:
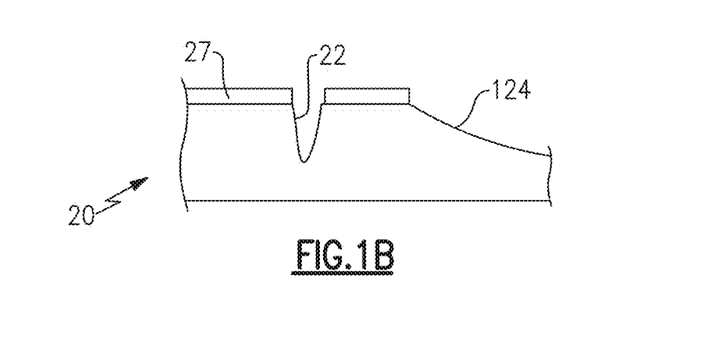
FIG. 1B shows a detail of the FIG. 1A component.

As shown in FIG. 1B, the component 20 has a coating 27 which has been partially removed both in the area of the void 22, and in the wear area 124.

Figure 2A:
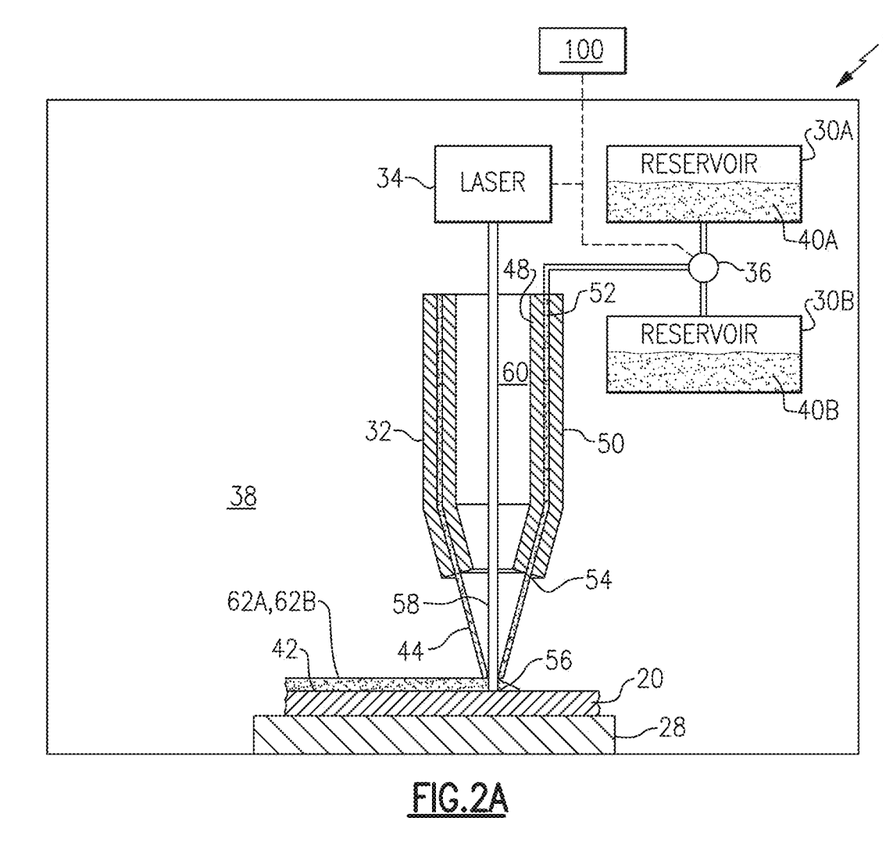
FIG. 2A shows an additive manufacturing device.
Figure 2B:
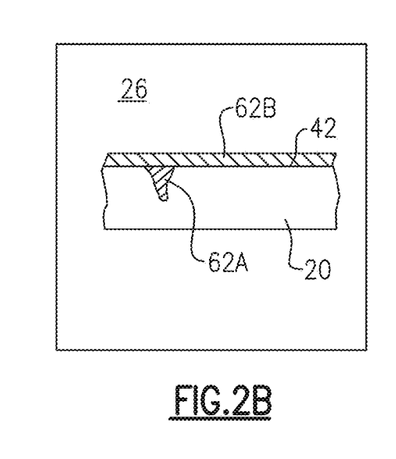
FIG. 2B shows a furnace associated with the FIG. 2A device.
Figure 2C:
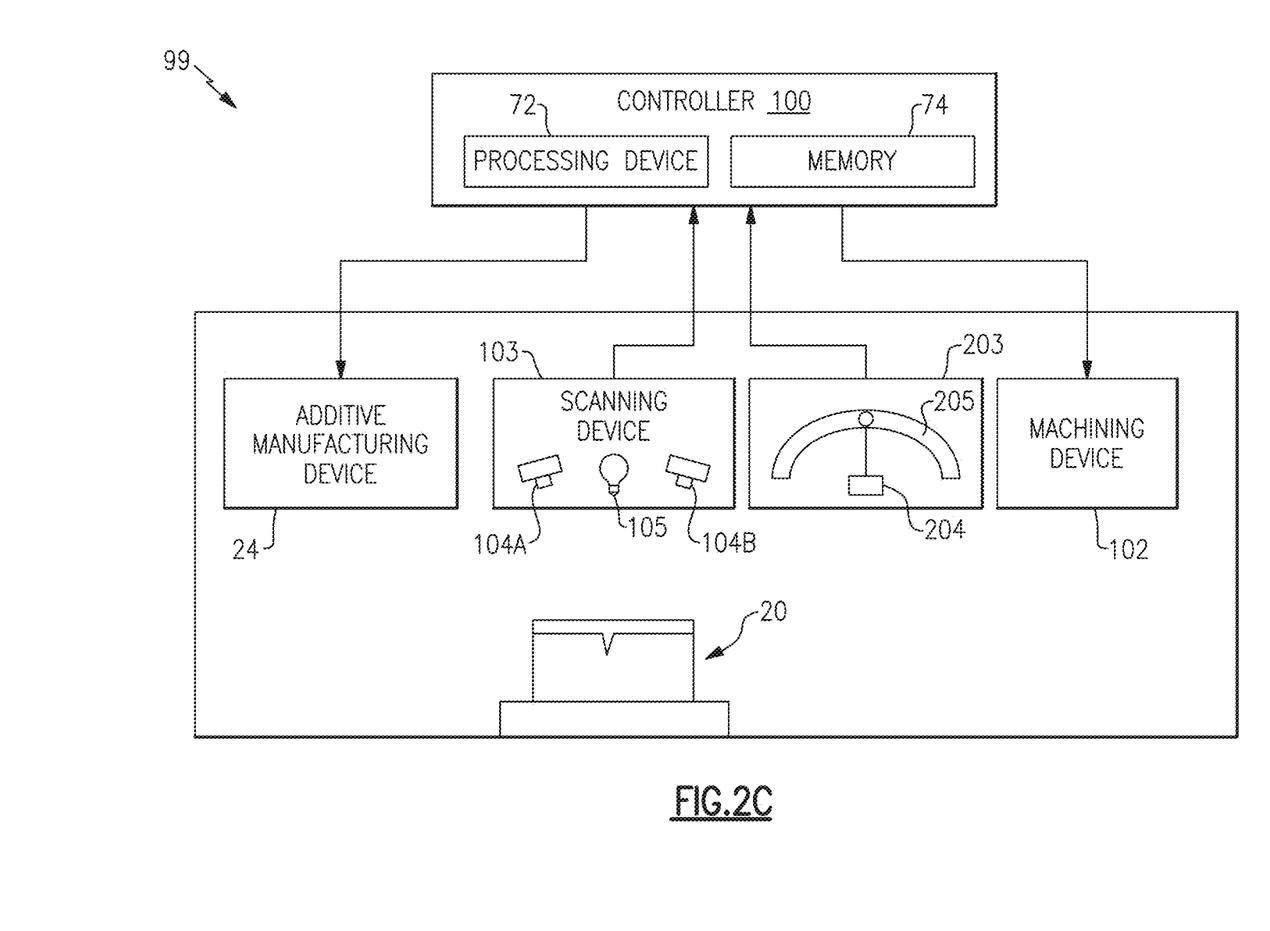
FIG. 2C shows a combined system for repairing a component.

FIGS. 2A-2C disclose a system which might be utilized to repair the FIG. 1A/1B component.

Referring to FIG. 2A, the additive manufacturing device 24 may be configured as a laser material deposition device, and may be called a direct laser braze cladding machine. A component support 28 supports a component 20 to be repaired. A pair of material reservoirs 30A and 30B are provided, as is a nozzle 32, a laser 34 and a material regulation device 36, all within an internal build chamber 38. The first material reservoir 30A stores a quantity of first braze powder 40A, and second material reservoir 30B stores a quantity of second braze powder 40B, to be supplied to the nozzle 32 through the material regulation device 36 during select additive manufacturing device operations.

A control 100 is programmed to control material regulation device 36 to selectively direct the first braze powder 40A during a first mode, and selectively direct the second braze powder 40B during a second mode. The material regulation device 36 may also be controlled to selectively direct one or more combinations of the first braze powder 40A and the second braze powder 40B to the nozzle 32 during a third mode.

The nozzle 32 is controlled to deliver a (e.g., annular, conical) stream 44 of the braze powder toward a substrate of component 20. A tubular inner sidewall 48 and a tubular outer sidewall 50 define passage 52 (e.g., an annulus) fluidly coupled (shown schematically) to material flow regulator 36, and extends to a nozzle orifice 54. A distal end portion of the nozzle 32 and its inner sidewall 48 and its outer sidewall 50 may radially taper inwards as the nozzle 32 extends axially toward nozzle orifice 54. The nozzle 32 may focus the braze powder 40 to, around or about a target point 56 on, slightly above or slightly below the substrate surface 42. Of course nozzle 32 may be configured to deliver the braze powder 40 through an internal bore rather than an annulus.

Control 100 is programmed to control laser 34 to generate a laser beam 58 for sintering the braze powder 40 delivered by the nozzle 32 to the substrate 42. Herein, the term "sintering" may describe a process for coalescing powder particles together into a coherent solid mass by heating without (e.g., partial or complete) liquification of the powder. This is in contrast to, for example, a powder laser welding process where powder is melted to a liquid state (e.g., in a melt pool) by a laser beam and then solidified as a solid mass.

Laser 34 is controlled to direct the laser beam 58 to or about the target point 56 and heats the braze powder 40 for sintering. The laser beam 58 directed through an internal bore 60 of the nozzle 32 formed by the inner sidewall 48. Of course, the laser 34 may be configured to direct the laser beam 58 outside of the nozzle 32 or along another path through the nozzle 32.

The first braze powder 40A, for example, may be deposited on the component 20 to repair a first type of substrate defect such as, but not limited to, the void 22. The second braze powder 40B, by contrast, may be deposited with the component 20 to repair a second type of substrate defect such as, but not limited to, the wear region 124 of FIG. 1A and FIG. 1B. More particularly, the first braze powder 40A may be provided (e.g., selected, formulated, etc.) for increased wettability, flowability and/or capillary penetration. The first braze powder may thereby be particularly suited for entering and filling voids. The second braze powder 40B, on the other hand, may be provided (e.g., selected, formulated, etc.) for improved dimensional repair of the surface due to lower wettability and flowability. The second braze powder may thereby be particularly suited for forming claddings. Of course, it is contemplated the first braze powder 40A and the second braze powder 40B may be mixed together in some proportion to provide a combined braze powder with intermediate braze properties.

Examples of when the two powders could be mixed might be to achieve various proportions of the two. As examples, a designer might want a high-flow, a moderate-flow or a stiff final deposited powder. As one example, the second braze powder 40B may include higher proportions of the metal alloy powder relative to the braze material powder (e.g., 70/30). By contrast, the first braze powder 40A may include lower proportions of the metal alloy powder relative to the braze material powder (e.g., 30/70).

The first braze powder 40A may include a mixture of metal alloy powder (e.g., substrate powder) and braze material powder. The metal alloy powder may be selected to have a relatively high melting point and common or similar material properties as the substrate of component 20, e.g., an aluminum (Al) superalloy, a nickel (Ni) superalloy, a titanium (Ti) superalloy, etc. The braze material powder, on the other hand, may be selected to have a relatively low melting point, which is lower than the melting point of the metal alloy powder. The braze material powder, for example, may also include a common or similar base element as the substrate and/or the metal alloy powder (e.g., aluminum (Al), nickel (Ni) or titanium (Ti)) without the super alloying elements. The braze material powder may also include boron (B), silicon (Si) and/or other melting point suppressants which may help facilitate melting and diffusion of the metal alloy powder with the substrate. The present disclosure, however, is not limited to the foregoing exemplary braze materials.

The second braze powder 40B may include a mixture of the metal alloy powder (e.g., substrate powder) and the braze material powder. A ratio of the metal alloy powder to the braze material powder in the second braze powder 40B may be greater than a ratio of the metal alloy powder to the braze material powder in the first braze powder 40A. For example, the second braze powder 40B may include higher proportions of the metal alloy powder relative to the braze material powder (e.g., 60/40). By contrast, the first braze powder 40A may include lower proportions of the metal alloy powder relative to the braze material powder (e.g., 30/70). The present disclosure, however, is not limited to the foregoing exemplary braze powder makeups. In other embodiments, one or more or all of the constituent materials in the first braze powder may be different that one or more or all of the constituent materials in the second braze powder.

During the braze powder deposition, the additive manufacturing device 24 of FIG. 2A may dispose the respective braze powder 40 onto the substrate 42 at or about the target point 56. The laser 34 may concurrently sinter this respective braze powder 40 at the target point 56 together and/or to the underlying substrate 42.

As shown, the additive manufacturing device 24 may selectively deposit the first braze powder and/or the second braze powder over the substrate such that areas which need repair, and optionally areas adjacent and/or surrounding those areas, are filled with the sintered first braze material 62A and/or coated with the sintered second braze material 62B. In other embodiments, the first braze powder and/or the second braze powder may be deposited over an entirety of the substrate 42 and excess material may later be removed. The braze powders may be deposited as one or more layers.

Referring to FIG. 2B, a furnace 26 is configured to receive the component 20 with the sintered first braze material 62A and/or the sintered second braze material 62B within furnace 26. The furnace 26 subjects the component and the sintered braze material 62A and 62B to a heat cycle, for example under vacuum and/or in a partial pressure inert gas (e.g., argon (Ar) gas) environment. During this heat cycle, the sintered braze material(s) 62 may melt and diffusion bond to the substrate 42. An example of the furnace 26 is a vacuum furnace.

The furnace temperature is selected such that the sintered braze materials 62A and 62B melts, wets and flows into defects of the substrate by capillary action. Once the sintered braze material has melted, a relatively lower temperature may be selected and held in the same heat cycle for a duration. This sustained temperature may facilitate diffusion of the melting point suppressant material, and athermal solidification, resulting in a braze diffusion bond of the sintered material to the substrate. The diffusion duration may be between four (4) hours and twelve (12) hours. This elevated temperature, however, is less than a melting point temperature of the substrate material.

The elevated temperature for the braze melt, for example, may be between 1,500° F. and 2,500° F., and may be between 1,000° F. and 2,400° F. The inert gas environment may have a vacuum pressure range between, for example, 0.5 microns and 0.1 microns. Of course, the foregoing heat cycle parameters may vary depending upon the specific material composition of the substrate and the braze material, dimensions (e.g., thickness) of the sintered braze materials 62A and 62B, etc.

Following the heat cycle first braze filler material 62A, may partially or completely fill the void 66. The second braze filler material 72B may provide a cladding over the substrate 42 to restore a dimensional parameter of and/or reinforce the wear region 124 and/or other regions.

FIG. 2C shows an overall system 99 having a controller 100 controlling the additive manufacturing device 24, and a machining device 102, as will be explained below. A scanning device 203 which may be a computed tomography (CT) scan. As know, a CT scan takes a series of x-ray images taken from different angles about the component 20. Thus, an x-ray machine 204 is shown schematically with a guide 205 for allowing the x-ray machine to move to different angles relative to the component.

The component may alternatively move relative to the x-ray machine. The scanning device may be a flat-panel volumetric CT or conventional multidetector CT scanner. The flat-panel detector has wide z-axis coverage that enables imagine of entire object in one axial acquisition.

The component 20 also may be scanned by scanning device 103, which may be a structured light scan, as known. The scanning device 103 would thus include at least two cameras 104A and 104B or other image capture devices, directed at the component 20 from different perspectives. A light source 105 directs light at the component 20 and the image capture devices 104A and 104B capture images. Processing device 72 may operate as known to build the images. A memory 74 may be associated with historic manufacturing device for the component 20.

The scanning device 103 may be a structured white light scanning device with a wavelength of between 400 and 700 NM or a structured blue light scanning device with a wavelength of between 450 and 495 NM.

Distortions in the pattern of light against the exterior of the component can be identified. The scanning device 103 in conjunction with processing device 72, can map the component based upon distortions in the pattern of light.

Controller 100 may be implemented with a combination of hardware and software. The hardware may include at least the processing device 72 and the memory 74. The processing device 72 may include single-core and/or multi-core processors. The memory 74 is configured to store software or execution by the processing device. The software execution may control and/or facilitate performance of the several operations described in this application. The memory 74 may be a non-transitory computer readable medium. As an example, the memory 74 can be configured to include a volatile memory and/or a non-volatile memory.

By using both types of scanning device, in combination with a controller 100, is thus able to identify a surface geometry of the component, and to map spatial coordinates for at least a portion (or the entirety) of the component 20. Using the CT scan data controller 100 can map the component. The same is true for the scanned data from the structural light scan. Such mapping would identify dimensions and location of features such as the void 22, and the wear area 124.

The scanned data may be in the form of a computer aided design model file, such as a stereolithography model file. Controller 100 may compare the mapped substrate characteristics from the scanned data with respective characteristics from reference data. The reference data may be data input from an OEM design specification for the component 20. In other words, the controller 100 may compare the mapped characteristics from the scan of the current component 20 being worked on to corresponding characteristics of the design specification.

The controller 100 may generate a solid model of the scan data to compare to a solid model of a design space component. The controller 100 thereby evaluates the current state and condition of the component 20 and determines what additive operations need to be performed. Among the determined operations could be the amount of additive manufacturing materials to be deposited, which type, where to deposit the additive manufacturing materials, paths to follow for depositing of the additive manufacturing materials, all to put the component back to being closer to the design space.

The controller 100 may also generate a solid model of the component after treatment in a furnace, and determine what subtractive operations, or machining tool paths, need to be performed to return the component to be close to its original design space.

Figure 3:
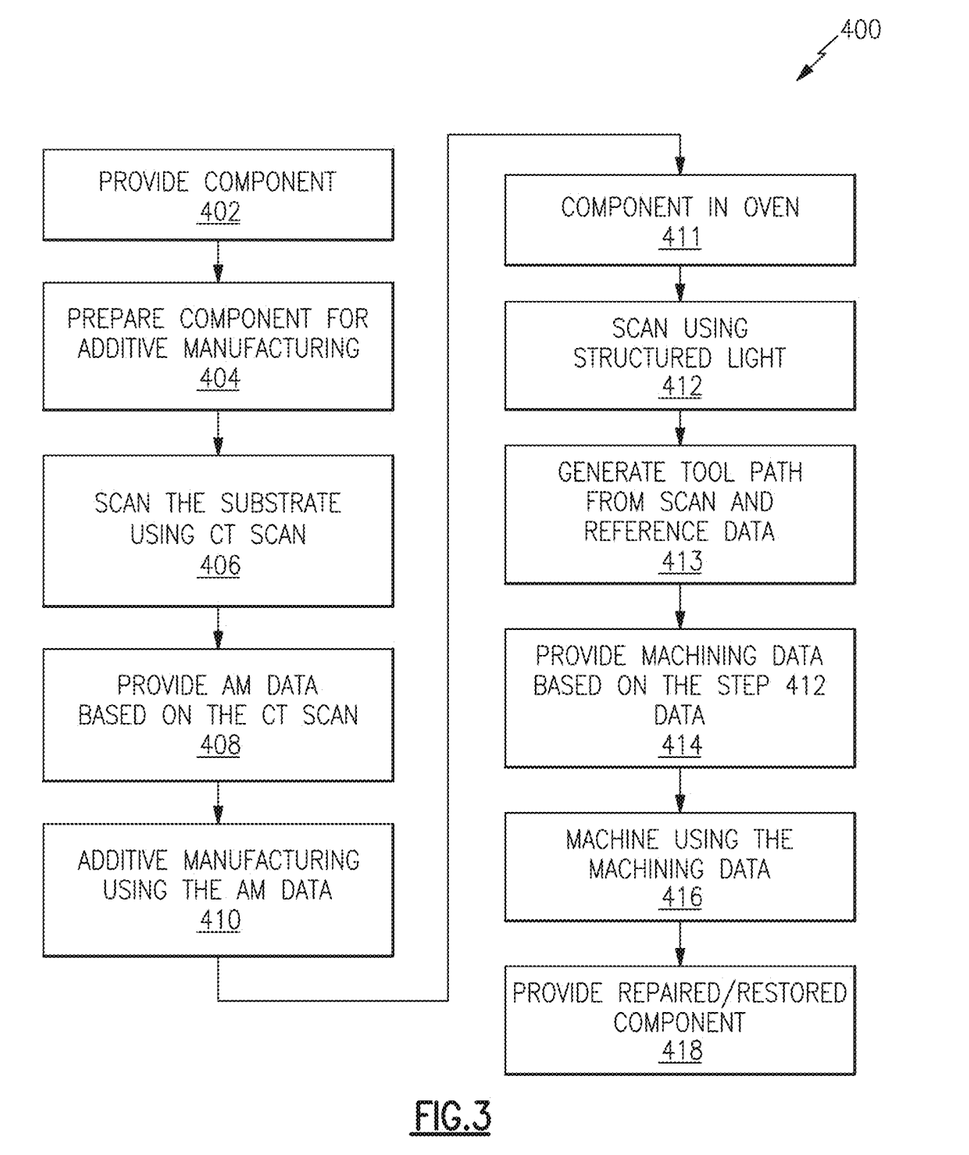
FIG. 3 is a flowchart of a method according to this disclosure.

A flowchart of a method according to this disclosure is illustrated in FIG. 3. The flowchart should be studied in combination with FIGS. 4, 5, 6, 7A, 7B, 8 and 9.

Figure 4:
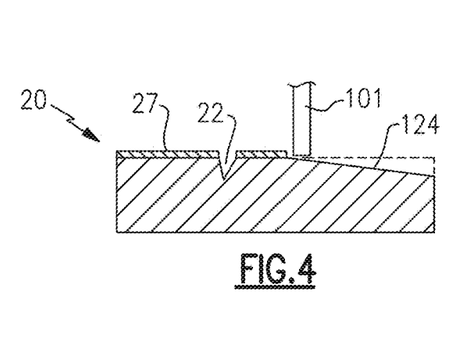
FIG. 4 shows a component needing repair.

As shown in FIG. 4, the component 20 to be repaired is as shown in FIG. 1B. There is a void 22 and a worn area 124. There is residual coating 27. At step 402 this component is provided for repair.

At step 404 the component is then prepared for additive manufacturing repair. Any number of steps may be performed as known to prepare the component. One such step is shown in FIG. 4 with a tool 101 removing the residual coating 27. Other known preparation steps may also be taken.

Figure 5:
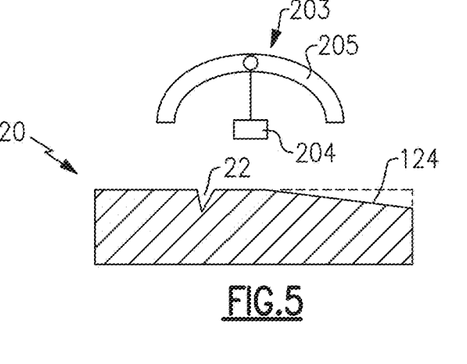
FIG. 5 shows a first step in the repair process.

Then, at step 406, the component 20 is scanned. The scanning device 203 is shown with the x-ray machine 204 moving about the surface of the component in the guide 105. As mentioned above, the part may alternatively be more relative to the x-ray machine.

The scanned data may be aligned with reference data such as a design specification of the component or an OEM model. Because the vane may have shifted during an engine heat cycle, the individual surface of the model vanes are broken apart and aligned to the substrate model from the scan. This creates a unique geometry to correct the performance of the part without returning the part to the original casting. This unique geometry represents a desired component file. Steps may further include importing pre-braze data, reverse engineered surfacing and subsequent toolpath generation. The substrate model is essentially what the part to be repaired is now.

At step 408, the data from the scan is provided to the controller 100, and the additive manufacturing tool path is determined based upon the scan. The desired component file is what is essentially compared to the substrate file.

Figure 6:
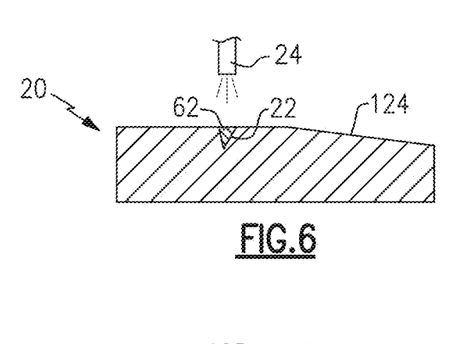
FIG. 6 shows a subsequent step in the repair process.

As shown in FIG. 6, the additive manufacturing tool 24 now applies the first material 62A to the void 22.

Figure 7:
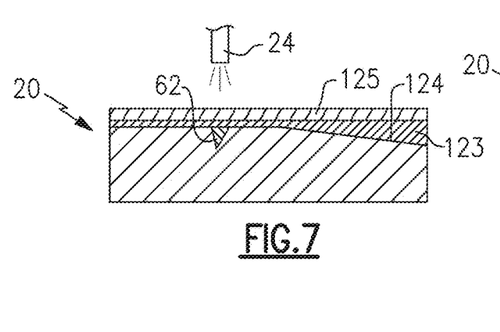
FIG. 7 shows a subsequent step.

In the FIG. 7, the additive manufacturing tool is shown supplying a second material 62B to the worn area 124. In addition, as can be appreciated, there is additional material 125 which has been deposited which is not desired on the final repaired component. Thus, there is material 123 which is desirably left and additional material 125 which is desirably removed.

In combination, the action taken in FIGS. 6 and 7 constitute step 410 from the flow chart of FIG. 3.

Figure 8:
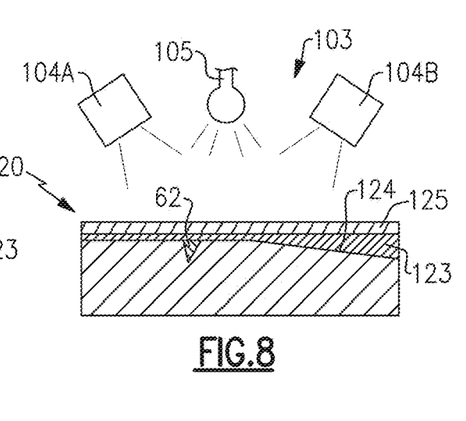
FIG. 8 shows a scan of the FIG. 7A step.

The component is then ran through a heat cycle in a furnace at step 411. Next, and as shown in FIG. 8, the component 20 is scanned using a structured light scan having a light 105 and a plurality of image capture devices 104A and B at step 412.

Applicant has recognized that CT scans will provide more information, and particularly information below the upper surface of the substrate in more detail than a structured light scan. However, CT scans take significantly longer than structured light scans. As such, by incorporating both, the detailed understanding of the structure of component, and in particular, the structure beneath the surface is identified, but the process speed is quickened using the structured light scan for the second scan.

Next, at step 413 a tool path is determined for removing the material 125 such that repaired component will approach its original state. In step 414, machining data will be developed in the controller 100 based upon the step 412 data.

Essentially, at step 412 the AM data is aligned to the substrate model. The result is then compared to reference data (e.g. the desired component file) and the subtractive machining toolpath is determined.

Figure 9A:
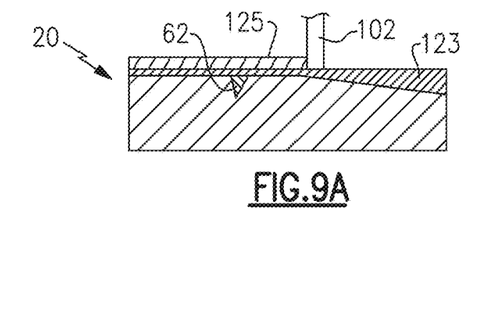
FIG. 9A shows subsequent machining of the FIG. 8 component.
Figure 9B:
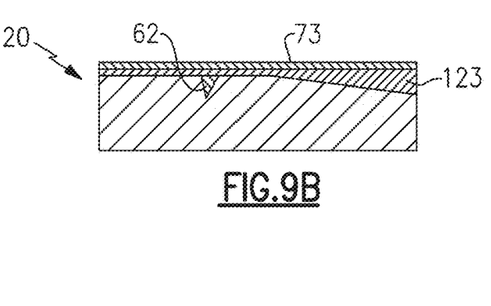
FIG. 9B shows a final optional manufacturing step.

Then, at step 416 and as shown in FIG. 8, a tool 102 may remove the additional material as shown. Finally, at step 418 and FIG. 9, an outer coating 73 could be added to the repaired component 20. While specific reference data sets are mentioned, other reference data sets can be used.

Examples of the machining tools 101 and 102 may be any number of known material removable tools controlled to be movable about any number of axes.

The reference data compared to the CT scan and to the structured light scan could be the same reference data or could include two distinct files.

The reference data used to develop the AM path and the machining path may be the same file or could include two distinct files.

In a featured embodiment, a method of overhaul of a component 20 includes a) scanning 406 a component using computed tomography 203 to provide first scanned data, b) comparing the first scanned data to reference data to provide additive manufacturing data, c) depositing material 410 on the component using an additive manufacturing device 24 based upon the additive manufacturing data to provide a first object, d) scanning the first object 413 using structural light scan 103 to provide second scanned data, and determining predicted characteristics of the first object based upon the second scanned data of step a), e) comparing the predicted characteristics of the first object to the reference data to provide machining 416 data and f) machining the first object using the machining data.

In another embodiment according to the previous embodiment, the structured light includes structured white light.

In another embodiment according to any of the previous embodiments, the structured light includes structured blue light.

In another embodiment according to any of the previous embodiments, the reference data includes data from a design specification for the component.

In another embodiment according to any of the previous embodiments, the depositing of the material in step c) fills a void in the component.

In another embodiment according to any of the previous embodiments, the depositing of a material in step c) also forms a cladding over a substrate of the component.

In another embodiment according to any of the previous embodiments, a first material is utilized to fill the void, and a second different material is utilized to form the cladding.

In another embodiment according to any of the previous embodiments, the depositing of the material forms a cladding over a worn surface on the component.

In another embodiment according to any of the previous embodiments, further including removing a residual coating from the component to expose a surface prior to step c).

In another embodiment according to any of the previous embodiments, step c) includes depositing braze powder on the component and heating the braze material with a laser 32 to sinter the braze material.

In another embodiment according to any of the previous embodiments, after the sintering of step c), the component is then put through a heat cycle 26 to melt the braze material.

In another embodiment according to any of the previous embodiments, the machining of step f) removes some of the material 125 deposited during step c).

In another embodiment according to any of the previous embodiments, further including coating 73 a surface of a second object, wherein the second object is formed by the machining of the first object in step f).

In another embodiment according to any of the previous embodiments, the component is from a gas turbine engine.

In another featured embodiment, a method of overhaul of a component includes a) scanning a component using computed tomography to provide first scanned data, b) comparing the first scanned data to reference data to provide additive manufacturing data, c) depositing material on the component using an additive manufacturing device based upon the additive manufacturing data to provide a first object, d) scanning the first object using structural light scan to provide second scanned data, and determining predicted characteristics of the first object based upon the second scanned data of step a), e) comparing the predicted characteristics of the first object to the reference data to provide machining data and f) machining the first object using the machining data. Step c) includes depositing braze powder on the component and heating the braze material with a laser to sinter the braze material. After the sintering of step c), the component is then put through a heat cycle to melt the braze material. The machining of step f) removes some of the material deposited during step c).

In another embodiment according to any of the previous embodiments, the depositing of the material in step c) fills a void 22 in the component.

In another embodiment according to any of the previous embodiments, the depositing of the material forms a cladding 123 over a worn surface on the component.

In a featured embodiment, a system for overhauling a component include a scanning device 203 configured to scan a component using computed tomography and structured light 103 and provide first and second scanned data indicative of one or more characteristics of the component. An additive manufacturing device 24 is configured to deposit material on the component to provide a first object, with the additive manufacturing device controlled by additive manufacturing data. A machining device 102 is configured to remove material from the first object based upon machining data. A controller 100 is programmed to compare the first scanned data from the computed tomography with reference data to provide the additive manufacturing data. The controller is further programmed to compare the second scanned data with the reference data from the structural light to develop the machining data.

In another embodiment according to any of the previous embodiments, a laser 32 is provided to sinter the material after deposit.

In another embodiment according to any of the previous embodiments, further including a furnace, such the component can be put through a heat cycle to melt the material.

Although embodiments have been disclosed, a worker of skill in this art would recognize that modifications would come within the scope of this disclosure. For that reason, the following claims should be studied to determine the true scope and content.

What is claimed is:

1. A method of overhaul of a component, comprising:
   a) scanning a component using computed tomography to provide first scanned data;
   b) comparing the first scanned data to reference data to provide additive manufacturing data;
   c) depositing material on the component using an additive manufacturing device based upon the additive manufacturing data to provide a first object;
   d) scanning the first object using structural light scan to provide second scanned data, and determining predicted characteristics of the first object based upon the second scanned data of step d);
   e) comparing the predicted characteristics of the first object to the reference data to provide machining data; and
   f) machining the first object using the machining data.

2. The method as set forth in claim 1, wherein the structured light comprises structured white light.

3. The method as set forth in claim 1, wherein the structured light comprises structured blue light.

4. The method as set forth in claim 1, wherein the reference data comprises data from a design specification for the component.

5. The method as set forth in claim 1, wherein the depositing of the material in step c) fills a void in the component.

6. The method as set forth in claim 5, wherein the depositing of a material in step c) also forms a cladding over a substrate of the component.

7. The method as set forth in claim 6, a first material is utilized to fill the void, and a second different material is utilized to form the cladding.

8. The method as set forth in claim 1, wherein the depositing of the material forms a cladding over a worn surface on the component.

9. The method as set forth in claim 1, further comprising removing a residual coating from the component to expose a surface prior to step c).

10. The method as set forth in claim 1, wherein step c) includes depositing braze powder on the component and heating the braze material with a laser to sinter the braze material.

11. The method as set forth in claim 10, wherein after the sintering of step c), the component is then put through a heat cycle to melt the braze material.

12. The method as set forth in claim 1, wherein the machining of step f) removes some of the material deposited during step c).

13. The method as set forth in claim 1, further comprising coating a surface of a second object, wherein the second object is formed by the machining of the first object in step f).

14. The method as set forth in claim 1, wherein the component is from a gas turbine engine.

15. A method of overhaul of a component, comprising:
a) scanning a component using computed tomography to provide first scanned data;
b) comparing the first scanned data to reference data to provide additive manufacturing data;
c) depositing material on the component using an additive manufacturing device based upon the additive manufacturing data to provide a first object;
d) scanning the first object using structural light scan to provide second scanned data, and determining predicted characteristics of the first object based upon the second scanned data of step d);
e) comparing the predicted characteristics of the first object to the reference data to provide machining data; and
f) machining the first object using the machining data,
wherein step c) includes depositing braze powder on the component and heating the braze material with a laser to sinter the braze material;
wherein after the sintering of step c), the component is then put through a heat cycle to melt the braze material; and
wherein the machining of step f) removes some of the material deposited during step c).

16. The method as set forth in claim 15, wherein the depositing of the material in step c) fills a void in the component.

17. The method as set forth in claim 15, wherein the depositing of the material forms a cladding over a worn surface on the component.

18. A system for overhauling a component comprising:
a scanning device configured to scan a component using computed tomography and structured light and provide first and second scanned data indicative of one or more characteristics of the component;
an additive manufacturing device configured to deposit material on the component to provide a first object, with the additive manufacturing device controlled by additive manufacturing data;
a machining device configured to remove material from the first object based upon machining data;
a controller programmed to compare the first scanned data from the computed tomography with reference data to provide the additive manufacturing data, and the controller further programmed to compare the second scanned data with the reference data from the structural light to develop the machining data;
a laser is provided to sinter the material after deposit; and
wherein further including a furnace, such the component can be put through a heat cycle to melt the material.

* * * * *